United States Patent [19]
Ku

[11] Patent Number: 5,419,580
[45] Date of Patent: May 30, 1995

[54] DIRECTION CHANGE DEVICE FOR USE WITH AN AUTOMOBILE

[76] Inventor: Dong C. Ku, 465-1, Mangwoo 2-dong, Junglang-Ku, Seoul 131-232, Rep. of Korea

[21] Appl. No.: 199,305
[22] PCT Filed: Sep. 3, 1992
[86] PCT No.: PCT/KR92/00040
§ 371 Date: Mar. 3, 1994
§ 102(e) Date: Mar. 3, 1994
[87] PCT Pub. No.: WO93/04900
PCT Pub. Date: Mar. 18, 1993

[30] Foreign Application Priority Data
Mar. 9, 1991 [KR] Rep. of Korea ............... 1991-15351

[51] Int. Cl.6 ............................................. B60S 9/18
[52] U.S. Cl. ...................................... 280/761; 180/199
[58] Field of Search ............... 280/761, 767; 180/199, 180/200, 202, 203

[56] References Cited

U.S. PATENT DOCUMENTS

| | | | |
|---|---|---|---|
| 2,162,257 | 6/1939 | Hoecker | 180/202 |
| 2,872,991 | 2/1959 | Collins | 180/200 |
| 2,931,448 | 4/1960 | Boutwell | 180/202 |
| 2,983,327 | 5/1961 | Hult | 180/202 |
| 3,011,575 | 12/1961 | Bouet | 180/200 |
| 3,826,322 | 7/1974 | Williams | 180/202 |

FOREIGN PATENT DOCUMENTS

| | | | |
|---|---|---|---|
| 114971 | 9/1940 | Australia | 180/199 |
| 8501921 | 5/1985 | WIPO | 180/199 |

Primary Examiner—Margaret A. Focarino
Assistant Examiner—Kevin Hurley
Attorney, Agent, or Firm—Birch, Stewart, Kolasch & Birch

[57] ABSTRACT

A direction changing device for use with an automobile having a chassis, a rear wheel frame, a suspension mounted to the rear wheel frame, and front and rear wheels is disclosed. The direction changing device is operated from a power source of the automobile and includes a cylinder having a device for securing the direction changing device to the suspension, a downwardly extending piston housed within the cylinder, a direction changing wheel connected to a lower end of the piston, a wheel lifting motor fixed to one side of the cylinder for raising and lowering the direction changing wheel and a wheel orienting motor movably mounted to another side of the cylinder for orienting the direction changing wheel. A foldable bracket is pivotally mounted to a lower end of the downwardly extendable piston, the direction changing wheel being movably attached to a lower end of the foldable bracket, such that the foldable bracket is locked in place when completely folded or unfolded. When a direction of the automobile is to be changed, the direction changing wheel is extended upon a downward movement of the piston, resulting in the rear wheels of the automobile being lifted slightly from a ground surface. The direction changing wheel is changed to a desired orientation by the wheel orienting motor and is moved in the desired direction by a driving force of the front wheels after a rotational angle of the front wheels has been adjusted.

10 Claims, 14 Drawing Sheets

DIRECTION CHANGE DEVICE FOR USE WITH AN AUTOMOBILE

BACKGROUND OF THE INVENTION

1. Field of the Invention

The present invention relates to a direction change device for use with a front wheel driving automobile and more particularly to a direction change wheel which is mounted to a conventional suspension of an automobile chassis.

2. Description of Related Art

To improve prior Korean patent application Nos. 89-4546 and 89-4547, the direction change device of the present invention is mounted to a middle portion of the conventional suspension which is secured to the shaft of the rear wheels, with the structure of the chassis being unchanged.

With a conventional driving and direction changing device, the direction change for parking or stopping of an automobile is generally achieved through several operations of a steering wheel.

In recent years, the number of automobiles has increased explosively on a world-wide scale. Accordingly, parking lot security is on the rise, particularly in towns and cities. To solve parking problems, underground parking in a building or tower parking has been provided. However, there is still not enough parking available to solve the parking or stagnation problem.

Another plan has been proposed to solve the problem. That is, an automobile with a direction change device has been proposed. With the direction change device, the automobile is parked easily in a narrow area, whereby the unit area per one automobile may be decreased. This means that more automobiles can be parked in the unit area.

Japanese patent application Nos. 67-21689 (published on Oct. 25, 1967) and 69-30286 (published on Dec. 6, 1969) and Korean patent application No. 88-562 disclose direction change devices. In the devices, the radius of direction change of automobiles is minimized or an automobile is lifted, shifted sidewards and changed in its direction to some degree. These prior art devices have the disadvantage that the chassis of the conventional automobile should be changed structurally and hydraulic devices with a separate frame should be additionally provided, resulting in an increased weight of an automobile. Furthermore, the appearance is not easily changed and safety is therefor not ensured. Thus, the prior art direction change devices have not been practical in application.

The prior direction change device has been improved by my inventions of Korean patent application No. 89-4546 and 4547. However, in the inventions, the chassis and the hydraulic system were changed for mounting of the direction change device, which causes difficulty in putting the device into practical use.

SUMMARY OF THE INVENTION

An object of the present invention is to provide a direction change device for use with an automobile by which the direction of the automobile is easily changed even in a narrow area.

Another object of the present invention is to provide a direction change device for use with an automobile which is mounted to the conventional chassis of an automobile.

The direction changing device of the present invention comprises a cylinder having securing means for securing the direction changing device to a suspension, a downwardly extendable piston, the cylinder further having a wheel lifting motor fixed to one side thereof and a wheel orienting motor movably mounted to the other side thereof, a foldable bracket and a direction change wheel both movably attached to the lower end of the piston, the foldable bracket being locked in place when completely folded and unfolded, whereby, when the direction of the automobile is desired to be changed, the direction change wheel will move to an upright position resulting in rear wheels of the automobile being lifted slightly from the ground upon the downward movement of the piston, turn to the desired direction, and then move the automobile in the desired direction by the driving force of the front wheel after the rotational angle has been adjusted.

DETAILED DESCRIPTION OF THE PREFERRED EMBODIMENT

Figure 1:
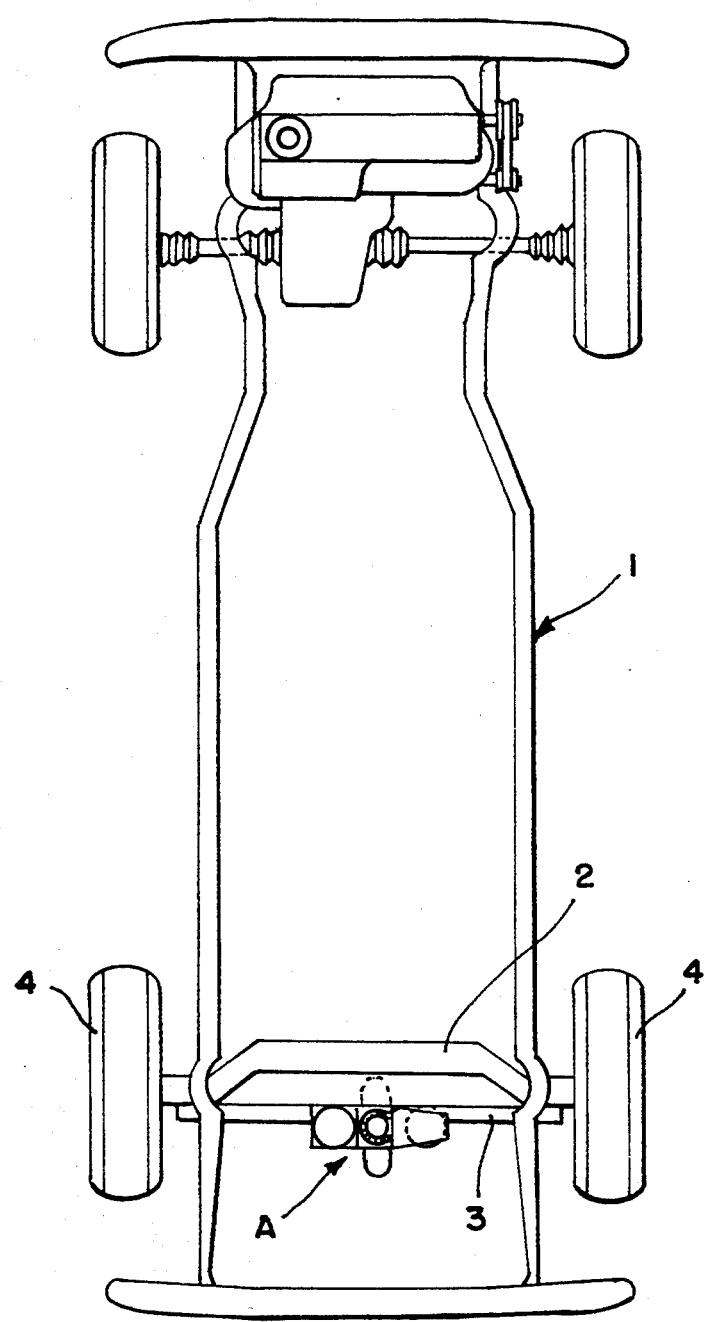
FIG. 1 is a plan view of a chassis on which a direction change device of the present invention is mounted.

FIG. 1 is a plan view of a chassis 1 on which a direction change device A of this invention is mounted. The device A is secured to the rear side of a rear wheel frame and mounted on a suspension 3.

The suspension 3 is manufactured separately and fixed to the rear or front side of the rear wheel frame 2. In this invention, the chassis 1 remains unchanged in its structure. Only the suspension 3 is slightly modified for easy mounting of the direction change device A thereto. The suspension 3 has rear wheel shock absorbing springs (not shown) mounted thereto for alleviating the vibration of the rear wheels 4 with respect to a body 5. The rear wheel shock absorbing springs are generally mounted adjacent to the inner sides of the rear wheels 4 and thus, do not affect the structure of the middle portion of the suspension 3.

Figure 2:
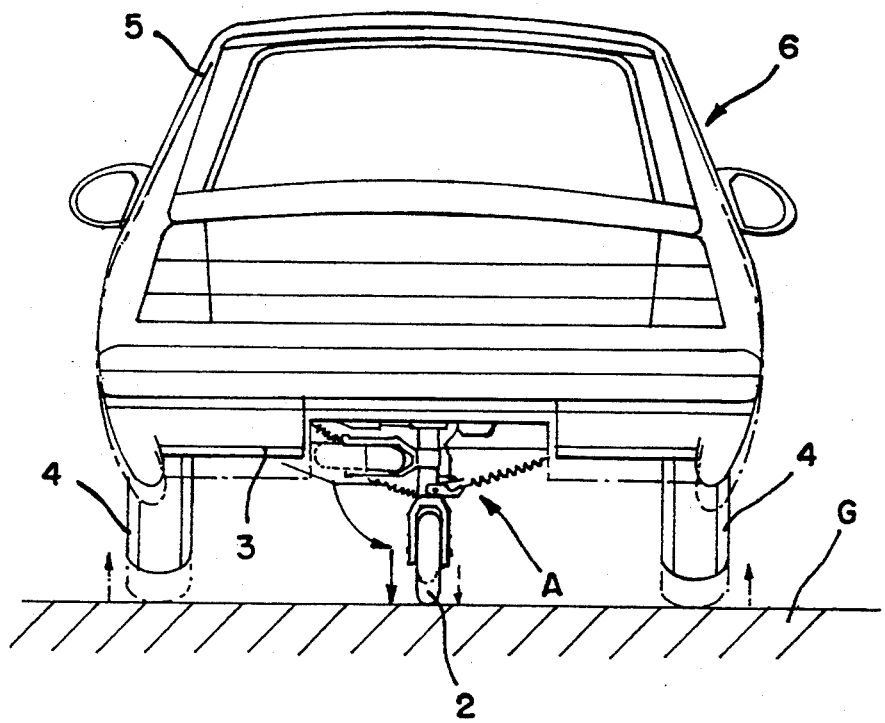
FIGS. 2 and 3 are rear and side views, respectively, of an automobile showing the automobile being lifted by the direction change wheel of the present invention.
Figure 3:
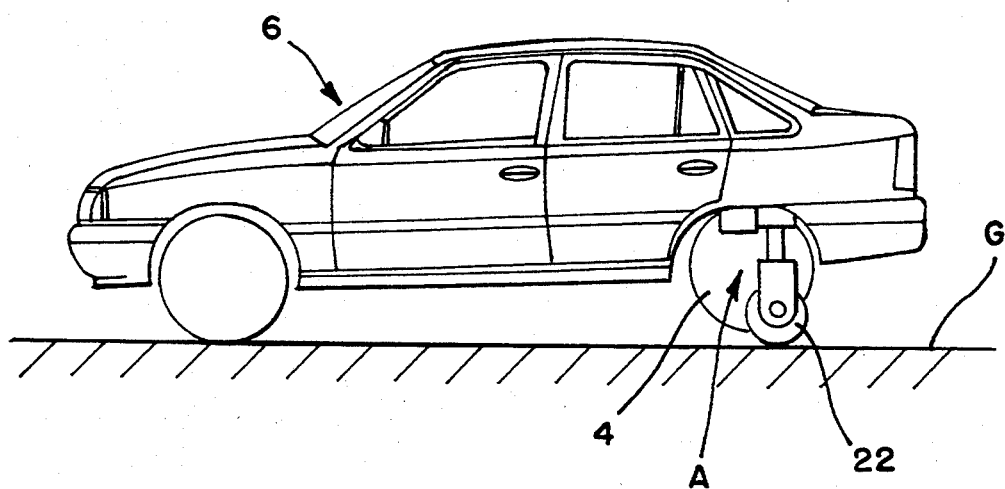

As shown in FIGS. 2 and 3, the direction change device A is mounted to the center of gravity of an automobile, i.e., to the center of the suspension 3 so as to effect a slight lift of the rear wheels 4 from a ground G.

The direction change device A comprises a cylinder 11 secured to the suspension 3 by securing means 10, such as bolts. The cylinder 11 has a wheel lifting motor 12 with an integral speed-reduction member 12a fixed to one side (in FIG. 4, right side) thereof, and has a wheel orienting motor 13 with a speed-reduction gear 13a movably mounted to the other side thereof.

Figure 7:
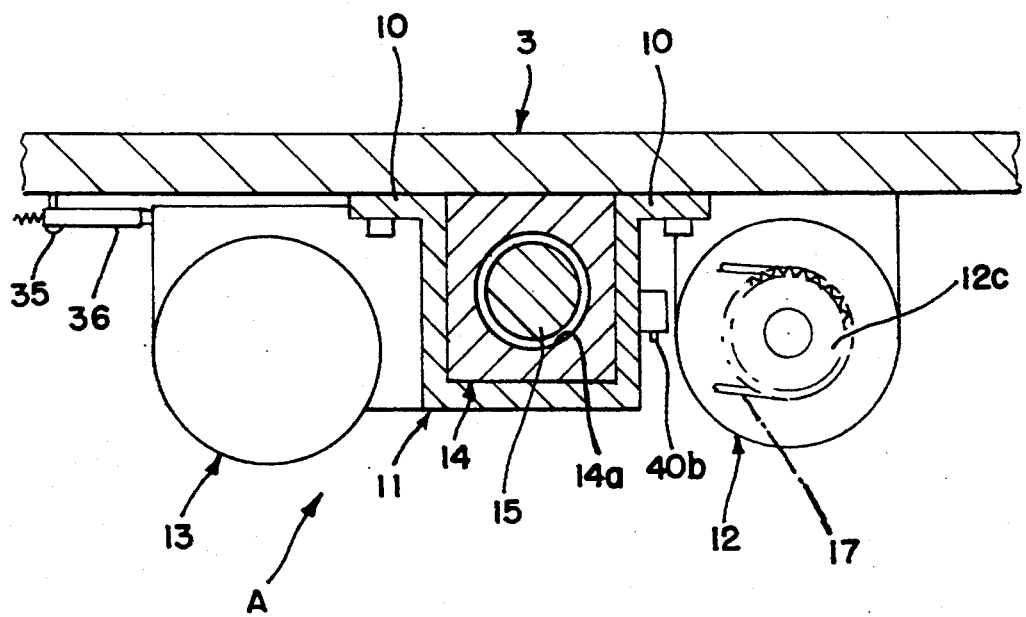
FIG. 7 is a cross-sectional view taken along line 7—7 of FIG. 6.

The cylinder 11 has a downward facing piston 14. As shown in FIG. 7, the piston 14 has a rotatable lead screw 15 therein which engages with a female screw 15a.

The lead screw 15 drives the piston 14 upward and downward. For this purpose, the lead screw 15 has a free lower end and an upper end which passes through the upper end of the cylinder 11 for mounting of a sprocket 16 thereon. The sprocket 16 is connected to a driving sprocket 12c through a chain 17. The driving sprocket 12c is mounted on an output shaft 12b extending upwardly from the fixed wheel lifting motor 12 so that the fixed motor 12 may drive the lead screw 15.

The wheel orienting motor 13 is secured to the lower end of the piston 14 so that the wheel orienting motor 13 and the piston 14 may be moved vertically at the same time.

Figure 4:
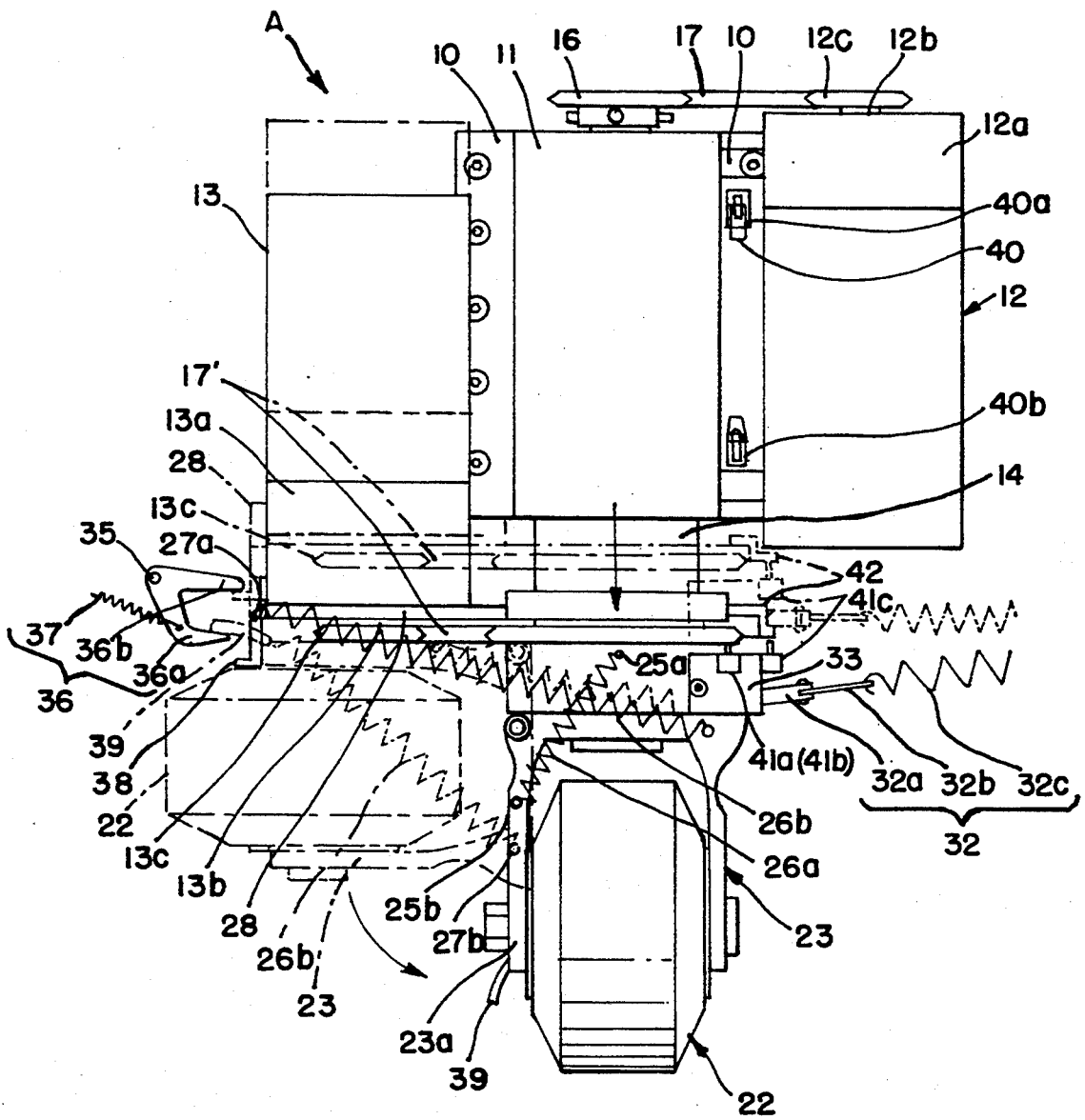
FIG. 4 shows a folding and unfolding operation of the direction change wheel of the present invention.
Figure 5:
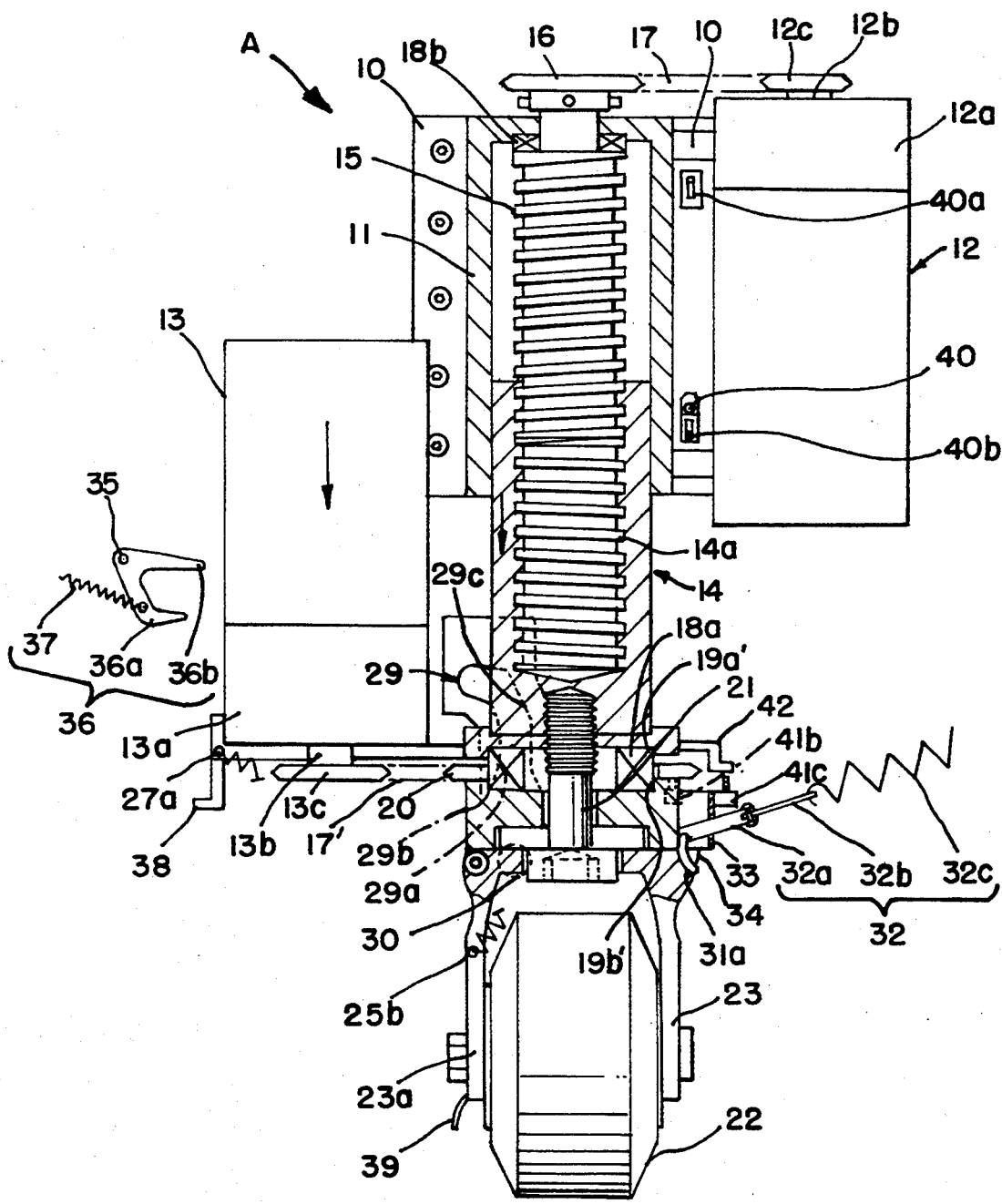
FIG. 5 is a sectional view showing the direction change device in an extended condition.

In FIG. 4, an upper support 19a is secured to the lower end of the piston 14. A sprocket 20 is mounted on the upper face of a lower support 19b. The sprocket 20 may be formed integrally with the lower support 19b.

A thrust bearing 18a is mounted between the upper and lower supports 19a, 19b which are bolted together via a bolt 21 of which an upper end is threaded with the lower end of the piston 14. The thrust bearing 18a is received in upper support grooves 19a' and lower support grooves 19b'. The thrust bearing 18a serves to space apart the upper support 19a from the sprocket 20, rotate the sprocket 20 and sustain a vertical load.

A foldable bracket 23 supports a direction change wheel 22 and is hinged at 24 to the lower support 19b. With this arrangement, the upper face of the bracket 23 is in close contact with the lower part of the lower support 19b when the bracket 23 is unfolded or stands upright. The folding and unfolding of the bracket is achieved through ninety degrees.

The sprocket 20 mounted on the upper face of the lower support 19b is connected to a sprocket 13c through a chain 17'. The sprocket 13c is mounted on a shaft 13b of the speed reduction member 13a of the motor 13. With this arrangement, the motor 13 may drive the lower support 19b and the bracket 23 causing the direction change wheel 22 to turn sideways and then return to a neutral position.

The folding and locking of the direction change wheel 22 is hereinafter described.

When the wheel 22 stands upright and the upright direction is in alignment with the direction of the automobile, a tension spring 26a has one end connected to a forward extension 25a of the lower support 19b and the other end connected to an extension 25b of one leg 23a of the bracket 23. In this state, the spring 26a is located a little to the right side of the vertical axis of the bracket 23 and to the right side of the hinge 24 forcing the bracket 23 and the lower support 19b to be in close contact with each other. As tension means cooperating with the tension spring 26a, a tension spring 26b is provided. The spring 26b has one end connected to an extension 27a of an L-shaped locking member 28 fixed to the upper support 19a, and the other end connected to an extension 27b extended from the corner of the bracket 23 opposite to the hinge 24. The tension spring 26b is arranged to be located above the hinge portion 24 when the bracket 23 is in an upright position.

Accordingly, when the direction change wheel 22 stands upright, the pair of tension springs 16a, 26b are arranged to cross each other with the cross point P being above the right end of the hinge 24 as shown in the solid line of FIG. 4.

The direction change wheel 22 is folded against the movable motor 13 through approximately ninety degrees, with the crossing point P located to the left of the hinge 24 as shown in the chain dotted lines of FIG. 4.

The folding and unfolding (upright) of the wheel 22 is automatically achieved according to the downward and upward movement of the piston 14.

A guide member 29 has an upper slanted guiding path 29c slanted toward the folding direction of the bracket 23, a middle vertical guiding path section 29a and an inverse V-shaped lower guiding path 29b. A roller 30 is movably disposed off the vertical axis of the direction change wheel 22 and adjacent to the hinge 24. The one-sided disposition of the roller 30 facilitates the folding of the wheel 22 and the bracket 23. The sliding of the roller 30 along the upper slanted guiding path 29a results in the automatic folding and unfolding of the wheel 22.

It is noted that the bracket 23 should be locked in place when folded or unfolded completely. For this purpose, a latch pawl receiving hole 31a is provided at one end of the bracket 23 opposite to the hinge 24 for receiving a latch pawl of the latch 32a of the locking means 32.

The locking means 32 is pivoted by a pivot pin 34 to a fixed member 33 of the lower support 19b. A sideward movable connecting member 32b is connected by a pin or the like to the rear end of the latch 32a. The rear end of the connecting member 32b is connected to one end of the suspension 3 through a coil spring 32c.

The front end of the coil spring 32c is fixed to a portion where the leading end of the latch 32a is able to be pivoted upwards about movable pivot pin 34 by the force of the coil spring 32c when a bracket begins to be folded when the piston 14 is driven approximately upwards. Conversely, the rear end of the coil spring 32c is desired to be disposed below a horizontal plane generally defined by the movable pivot pin 34 until the bracket 23 is unfolded completely to stand upright as the roller 30 slides along the uppermost slanted path section 29c. With this arrangement, when the bracket 23 is completely unfolded, the close contact between the upper face of the bracket 23 and the bottom face of the lower support 19b will not be prevented by the latch pawl of the latch 32a. Furthermore, when the movable pivot pin 34 moves continuously downwards below the horizontal plane upon the downward movement of the piston 14, the coil spring 32c will force the latch 32a and the connecting member 32b to move upwardly causing the latch pawl to be pivoted downwards about the pivot pin 34 and then to be received in the hole 31a. Consequently, the upper face of the latch 32a will be pressed against the upper face of the groove of the fixed member 33, and the latch pawl will firmly engage with the latch pawl receiving hole 31a by the force of the coil spring 32c as the tilting angle increases after the piston 14 is fully extended downwards. With this arrangement, the upright position of the bracket 23 is never collapsed when the wheel turns either to the right or to the left with the rear wheels 4 in a slightly lifted position with respect to the ground.

As the piston is driven upwards, the roller 30 will move upwards along the vertical guiding path section 29a to the uppermost slanted path section 29c and the bracket begins to be folded with the latch pawl of the latch 32a having been disengaged from the hole 31a.

The crossing point P of the springs 26a and 26b will also be changed. As shown in the chain-dotted lines of FIG. 4, when the crossing point P is moved to the left, the bracket 23 is forced to be quickly folded by the force of the springs 26a, 26b. A U-shaped locking member 26 is pivoted and connected to the upper, inside of the suspension by a pivot bolt 35 and a spring 37, respectively. The U-shaped locking member 36 has upper and lower legs 36a, 36b. When an L-shaped locking member 38 in upward movement presses against the upper leg 36b, the U-shaped locking member 36 will rotate causing the lower leg 36a to engage a locking extension 39 extending from one side wall of the bracket 23. With this arrangement, once the bracket 23 is compactly folded, the bracket 23 will maintain its compact folded state, thus being prevented from severe vibration or unlocking while an automobile is running.

As means for controlling the movable distance of the piston 14, control switches 40a, 40b are mounted to upper and lower portions of the side of the cylinder 11. A switch 40 for operating the control switches is mounted to a suitable portion of a fixed member 33. Limit switches 41a, 41b and a neutral switch 41c are mounted on the outer face of the fixed member 33. Switch actuating member 42 is fixed to the upper support 19a.

The control switches 40a, 40b control the wheel lifting motor 12 and the limit switches and neutral switch 41a, 41b, 41c control the wheel orienting motor 13. As the switches, micro limit switch or sensor utilizing electronic or infrared rays may be used.

It is desired that a driver should operate the device of this invention from the driver's seat. The indicator certifying left-right rotation and neutral position of the wheel is desired to be mounted at a position in which the back mirror can be viewed by the driver so that the existence of any hindrance at the position to which the direction of the wheel 22 is moved, may be easily found. It is desired that the select lever for left-right-neutral position should be mounted to a position where it can be easily operated by the driver (for example, around the hand brake).

Furthermore, it is possible that the steering wheel should cooperate with the select switch for vertical and sideways movement of the wheel 22.

The operation of the direction change device of the present invention is hereinafter described in detail.

During driving, the direction change wheel 22 is in a completely folded position as shown by chain-dotted lines of FIG. 4 by the tension force of the pair of springs 26a, 26b and the firm engagement of the U-shaped locking member with the lateral extension 39. With this arrangement, even if there is a severe violence during driving, the folded position is not easily collapsed. Mounting of the direction changing device to the suspension 3 will not cause trouble in driving an automobile because the cylinder 11 and motors 12, 13 are provided in a space above the suspension. The space is provided in all kinds of vehicles, and when mounted, the bottom of the direction changing device A is level with the chassis 1.

The direction changing device of the present invention was used for test on the automobile called "ELANTRA" manufactured by Hyundai of Korea. The suspension 3 of the ELANTRA was slightly modified for mounting of the direction changing device of the present invention thereto. However, automobiles other than ELANTRA need not be changed in its structure of the suspension for mounting of the device A of this invention.

Figure 6:
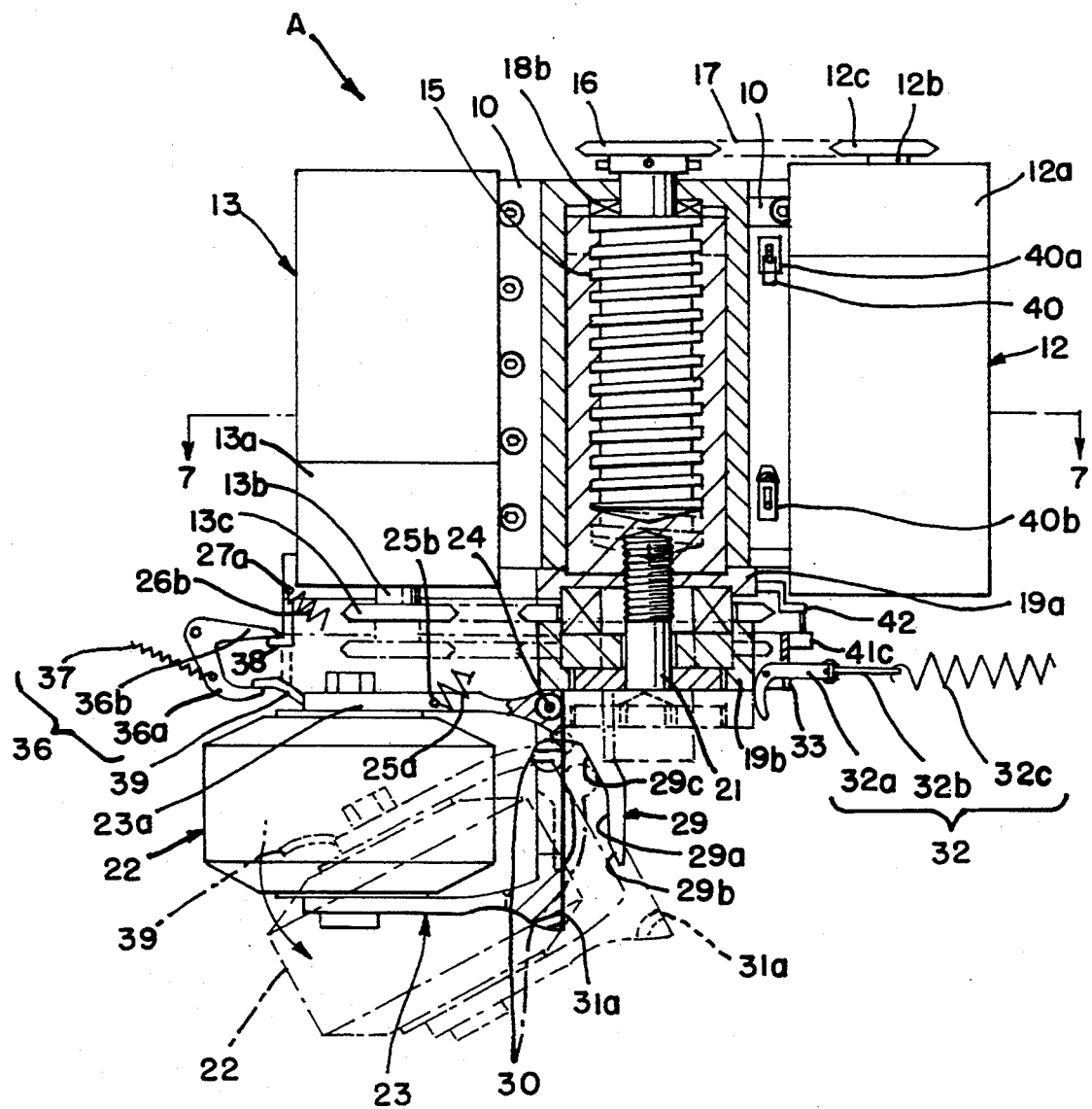
FIG. 6 is a sectional view showing the direction change device of this invention in a collapsible condition.

When the direction of an automobile is desired to be changed during driving under the condition that enough area for turning the front wheels of an automobile is not available, or when the turning of the automobile is desired in the shortest radius, or when the automobile is desired to be parked in a very small area, a driver is required to stop an automobile 6 and switch on the direction change device A for operating a piston operating lever (not shown). Then, the piston 14 will be lowered together with the L-shaped locking member 38 causing the pressing force of the upper leg 36b to be released, which causes the lower leg 36a of U-shaped locking member 38 to be released quickly from locking extension 39 which is attached to bracket 23 by the force of the spring 37. With the releasing of the lower leg 36a, the roller 30 located at upper side of bracket 23 moves downwards along the upper slanted guiding path section 29c of the guide member 29 causing the bracket 23 to move downward about the hinge 24. When the roller 30 reaches the end of upper slanted guiding path section 29c, the crossing point P of the springs 26a and 26b is at the right side of the hinge 24, as shown by the chain-dotted lines in FIG. 6, and the force of the spring 26a, 26b may cause the bracket 23 to be in an upright position (to the right side in FIG. 6). When standing upright, the upper face of the bracket 23 is firmly fixed in the bottom of the lower support 19b by the force of the springs 26a and 26b. During downward movement of the piston 14, a level of the pivot pin 34 with fixed member 33 and coil spring 32c is lowered gradually below the level of the suspension 3. With continuously downward movement of the piston 14, the latch pawl of the latch 32a is forced to pivot toward the hole 31a about the pivot pin 34 by the force of the coil spring 32. When the latch pawl firmly engages with the hole 31a, the bracket 23 is firmly locked in its upright position. Furthermore, the pressing force of the fixed member 33 further locks the bracket 23 in its upright position.

Accordingly, the locking means 32 in cooperation with the pivot pin 34 firmly sets the bracket 23. When the direction changing wheel 22 reaches the ground G upon continuous downward movement of the piston 14, the suspension 3 will be lifted, thus slightly lifting the rear wheels 4 of the automobile from the ground G. In this position, the wheel 22 receives about half of the total load of automobile 6. Therefore, the piston 14 and lead screw 15 should be strong enough to sustain this load, and the wheel lifting motor 12 and power transmission means for lead screw 15 should be composed of a material which is strong enough to lift the automobile 6. A thrust bearing 18b is mounted between the upper inside of the cylinder and the top surface of the lead screw for facilitating turning of the lead screw 15 even under a heavy load. The power of the wheel orienting motor 13 with its power transmission means should be strong enough for a direction changing operation of the wheel 22 when the wheel 22 reaches the ground and two rear wheels 4 of the automobile 6 are lifted slightly above the ground level. The wheel 22 is never collapsed even if applied with frictional force from between the wheel 22 and the ground G because the bracket 23 itself engages firmly with the pivot 24 and locking means 32 and the bracket maintains its firmly locked position.

As explained above, all operations for lifting and changing of the wheel 22 are performed from the driver's seat without getting out of an automobile. The direction changing device including cylinder, wheel lifting motor, wheel orienting motor is mounted in a suitable space around the suspension and rear wheel frame without structural modification of the suspension of almost every automobile to be manufactured throughout the world. It is within the scope of the present invention, instead of the motors 12, 13 and the lead screw, to use a hydraulically-operated cylinder.

A brief explanation of operating this invention is described below. The driver stops an automobile, and operates a lever to start to move the direction changing device A, which causes the wheel 22 to reach the ground G and to lift two rear wheels 4 slightly upward above the ground level. Thereafter, the driver selects the direction he wants to move the automobile to turn the wheel 22 to the left or right side, and manipulates the steering wheel to the left or right side to change the direction of the front wheel of automobile. In this state, changing direction is performed by rotating power of the front wheel and a more detailed example is shown in FIGS. 8 through 17.

The range of turning angle of the wheel 22 is not greater than that of the front wheels of the automobile, and the selection of turning angle of the wheel 22 could be made at the same degree and at the same time as the front wheel turns by the steering wheel, which is controlled automatically by the control system including a control switch. This kind of system enables the automobile to move easily and quickly with the shortest radius to the desired area.

Figure 8:
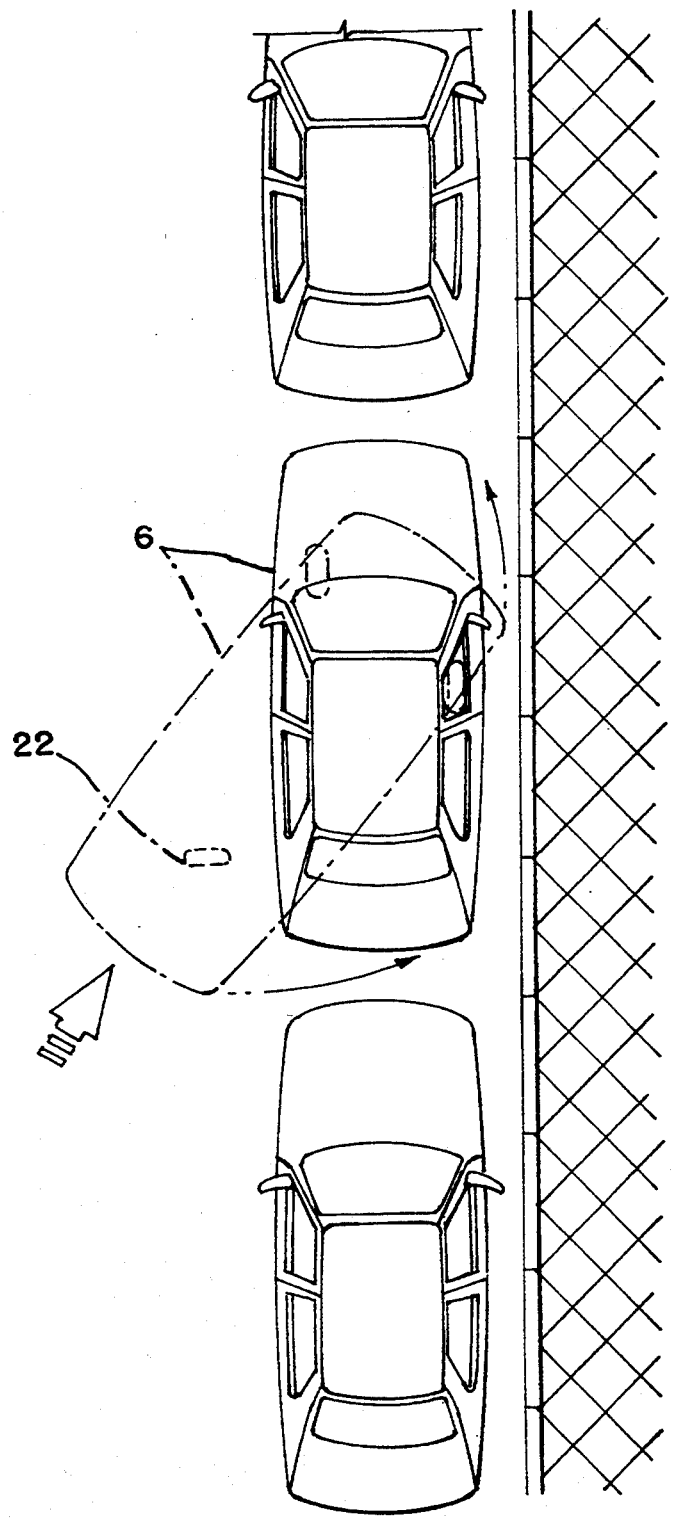
FIGS. 8 through 17 show examples of various direction changes of an automobile operated by means of the direction change device of the present invention.

FIG. 8 shows several cars parked along the road and only a small space for parking one car being available. The space is slightly longer than the length of the automobile, but it is so small that a driver cannot park an automobile by using only front wheel in a short time. In this situation, the automobile, on which this invented device is mounted, could be parked very easily and rapidly in the desired area. The front part of automobile 6 with direction changing device A moves into the parking area with a suitable angle as shown by chain-dotted lines in the drawings. At this time, the rear part of automobile should be as close as possible to the front part of the car which has already been parked at the rear side. The driver stops the automobile, operates a lever to initiate the direction changing device A, which causes the wheel 22 to reach the ground G and to lift the two rear wheels 4 upward slightly above the ground level. Thereafter, the wheel 22 is turned toward the direction of driving in (to the right side in FIG. 8) and manipulates the steering wheel to the intended direction before moving fore wheels of the automobile forward. By the above actions, parking an automobile in the intended area is completed as shown by solid lines in FIG. 8, which could be performed by simple manipulation of the steering wheel with direction changing device A in a short time, without interfering with other cars which may run along this road. After completion of parking, the direction changing device A returns to its original position by manipulation of a lever so that the rear wheels 4 of automobile 6 rest on the ground G. However, the driver could keep the wheel 22 in the vertical position after finishing parking without returning of the wheel to its original position in order to start after parking to drive from parking place forward to his intended destination, especially when only a limited time of stopping of an automobile at the parking area is permitted by the traffic control law in the country. In this case, the direction changing device A is not damaged because it is strong enough to sustain the load of the automobile.

Figure 9:
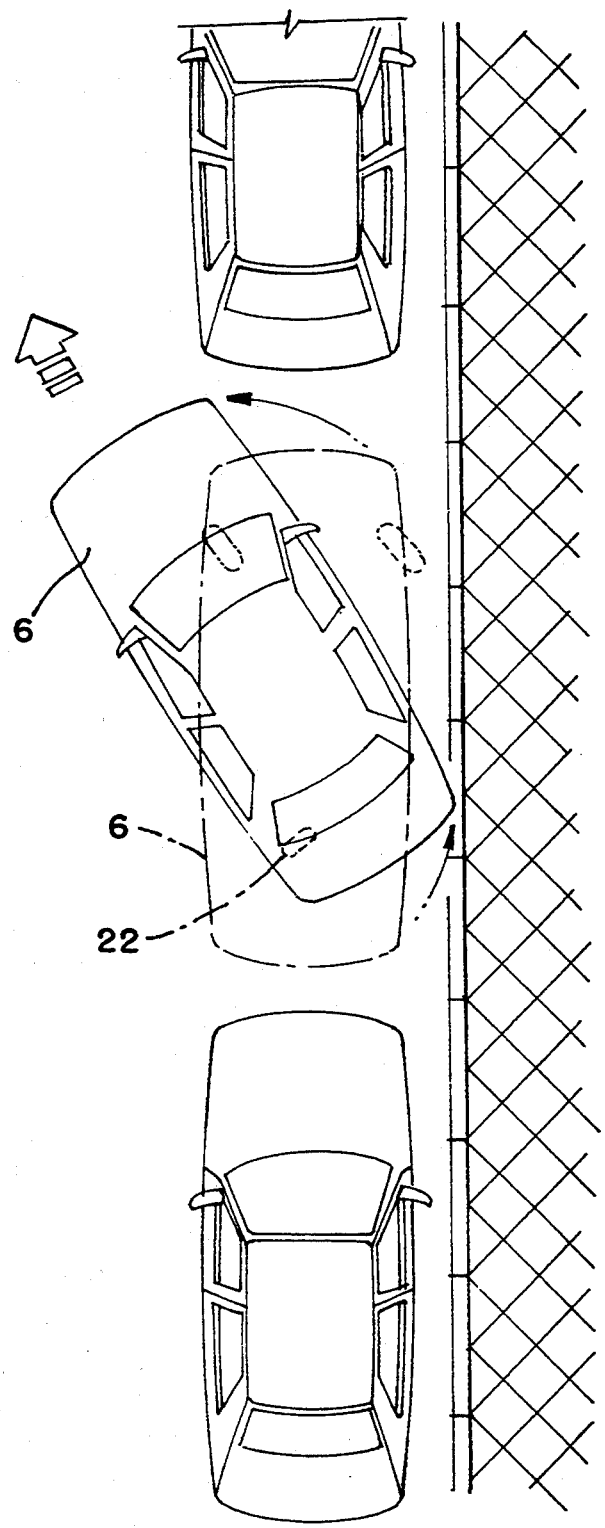

FIG. 9 shows a series of entering of an automobile from the parking area to driving lanes. The driver operates a lever to start to move direction changing device A, which causes the wheel 22 to reach the ground G and to lift two rear wheels 4 upward slightly above the ground level. Thereafter, the driver turns the wheel 22 toward the intended direction for moving the rear part of the automobile, and manipulates the steering wheel to turn the front wheels toward the driving lanes before starting to move and leave quickly from the parking place as shown by solid lines in FIG. 9.

Figure 10:
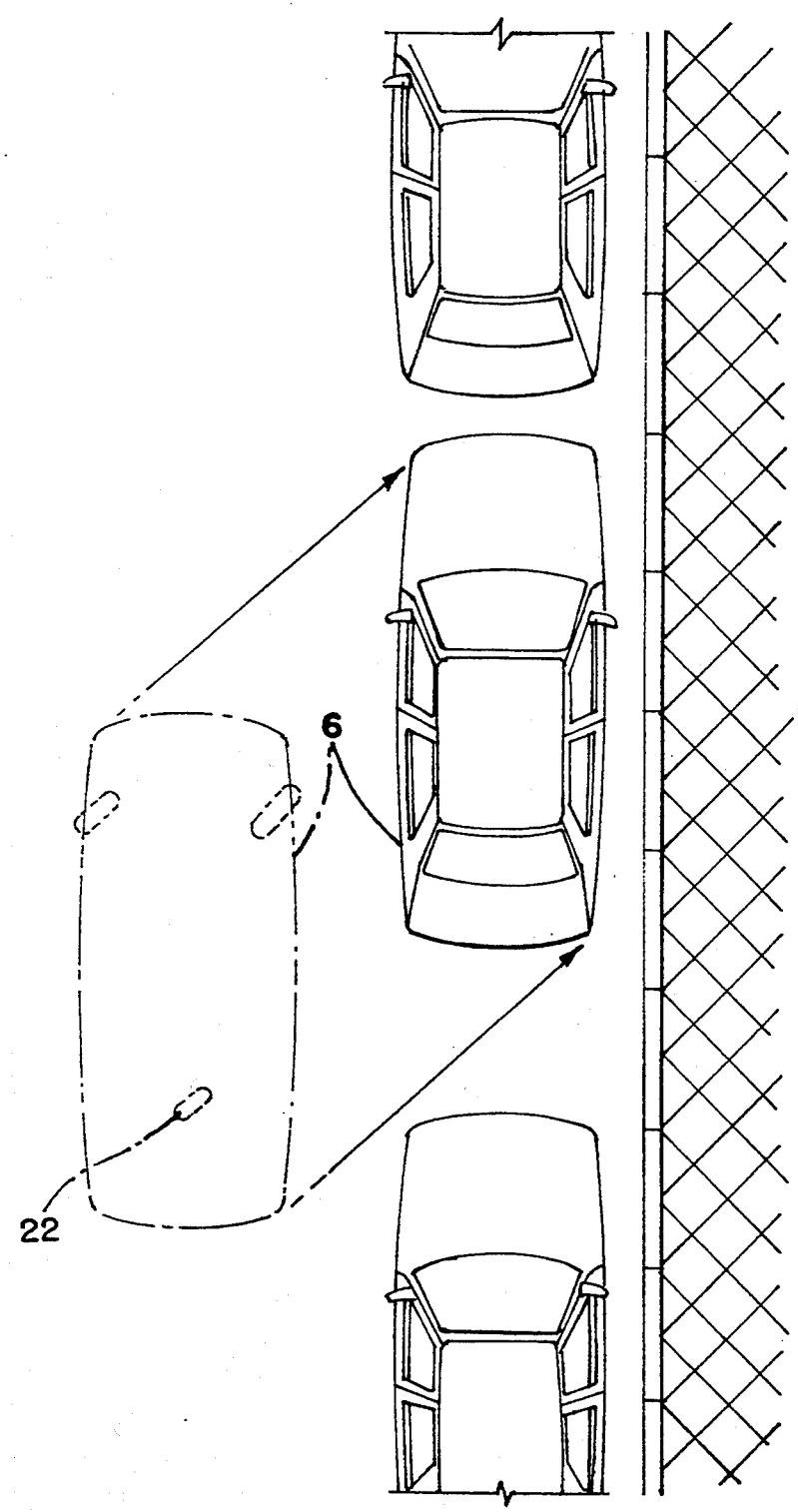
Figure 11:
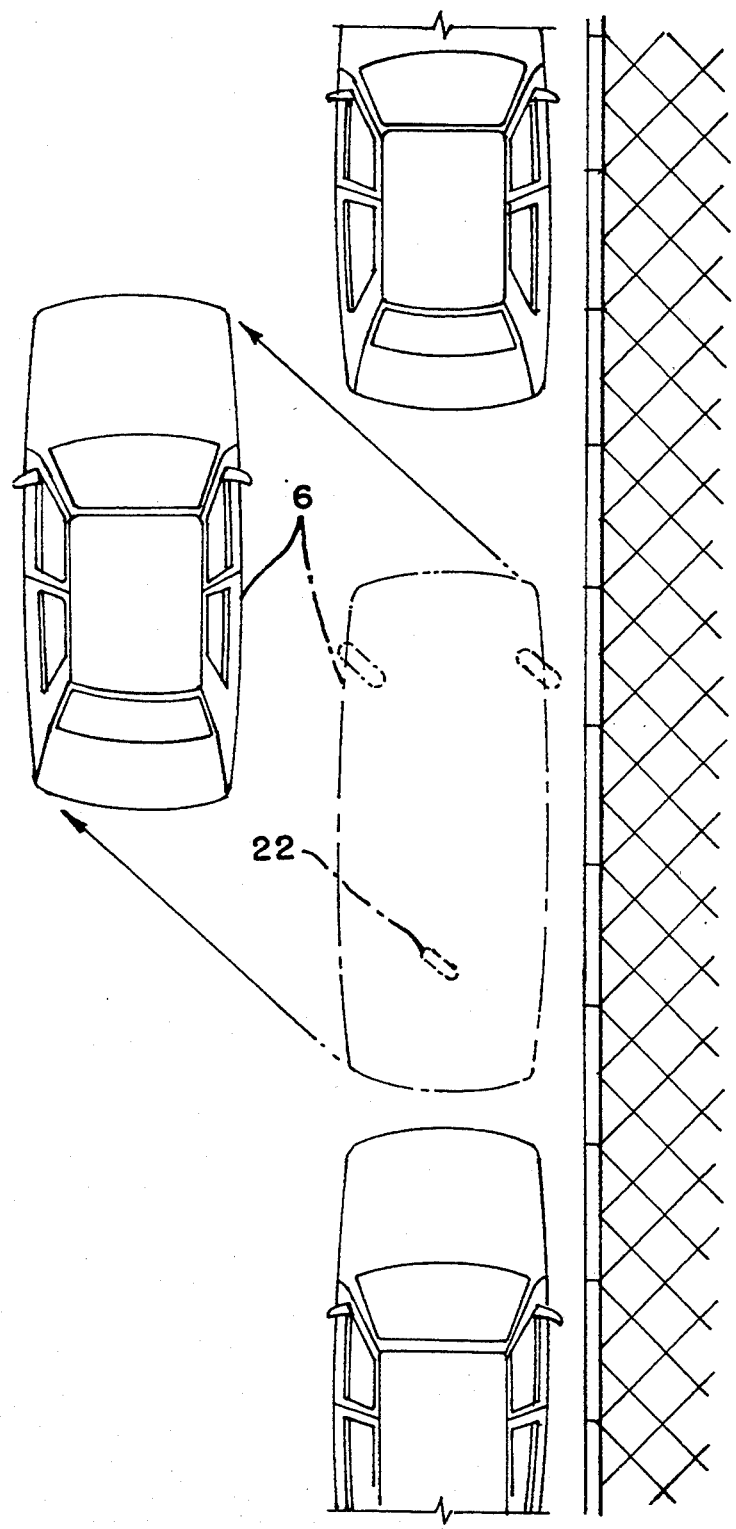

FIGS. 10 and 11 show examples different from those explained already in FIGS. 8 and 9. Automobile 6 moves forward and rearward in a diagonal direction for parking in a small parking area but a relatively large area when compared with those in FIGS. 8 and 9.

The driver turns the wheel 22 toward the intended direction along with front wheels of the automobile 6 in a parallel manner. Then the driver starts to move automobile 6 by front wheels.

Figure 12:
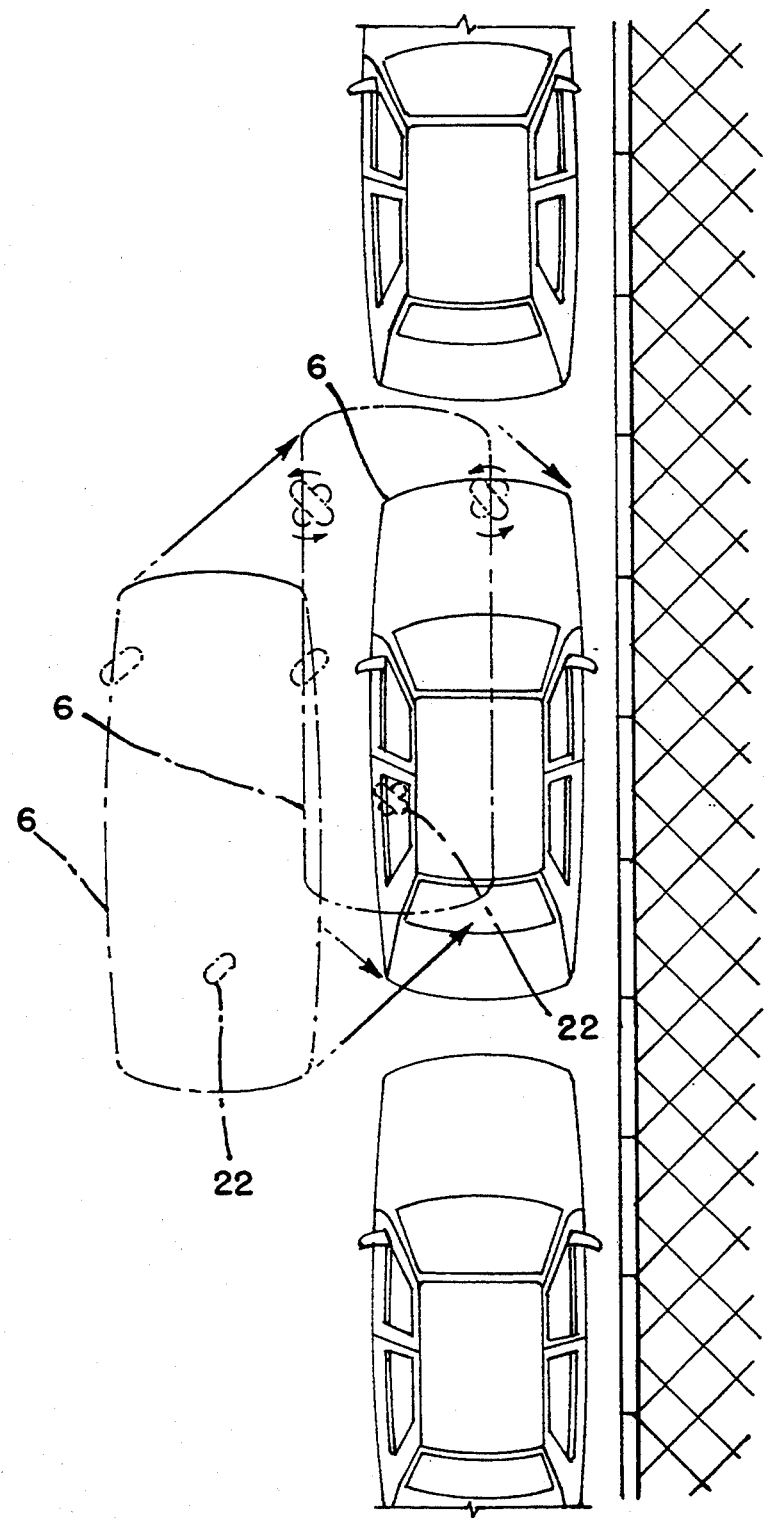
Figure 13:
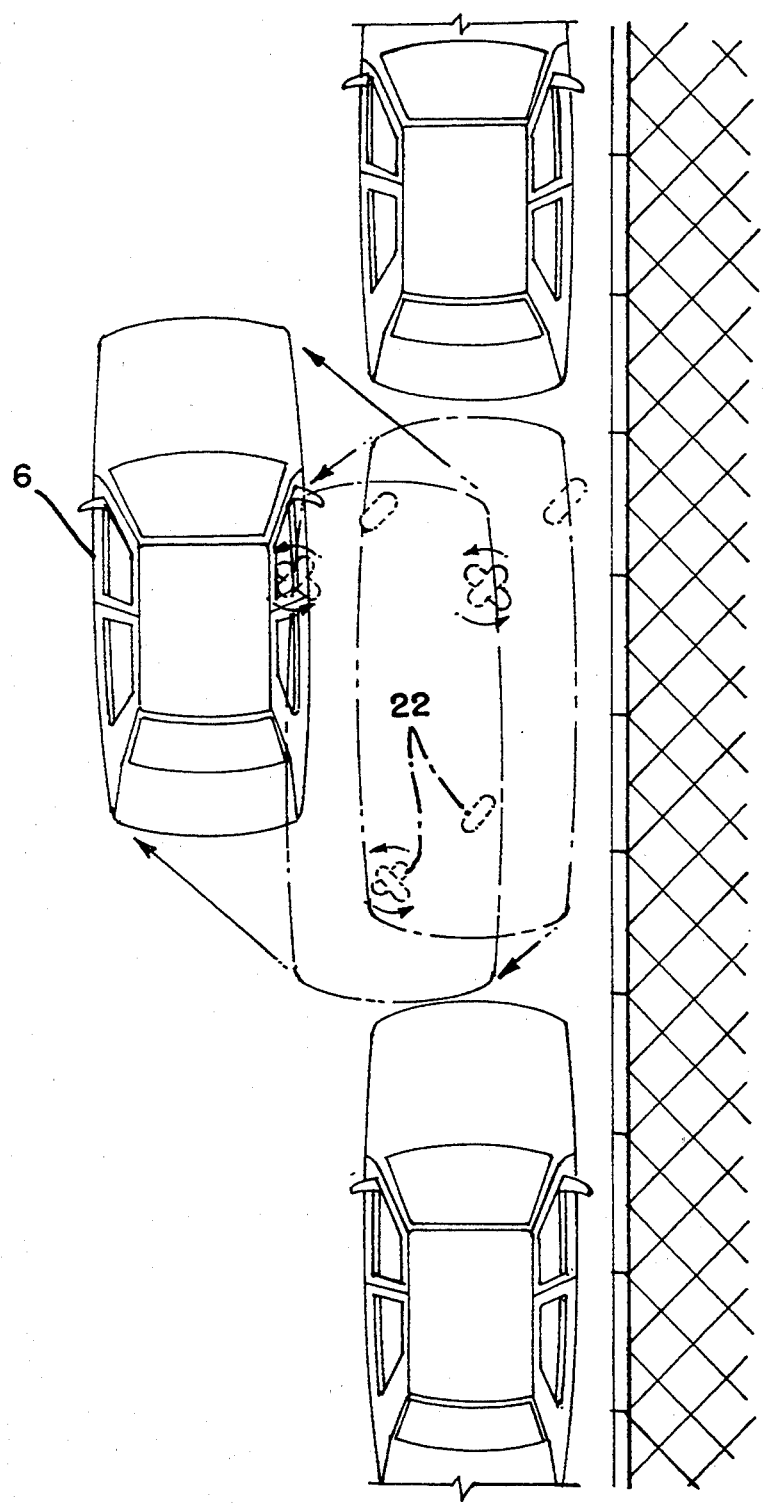

In case only a very small area for parking is available, the driver could repeat the procedure twice as explained and shown in FIGS. 12 and 13.

Figure 14:
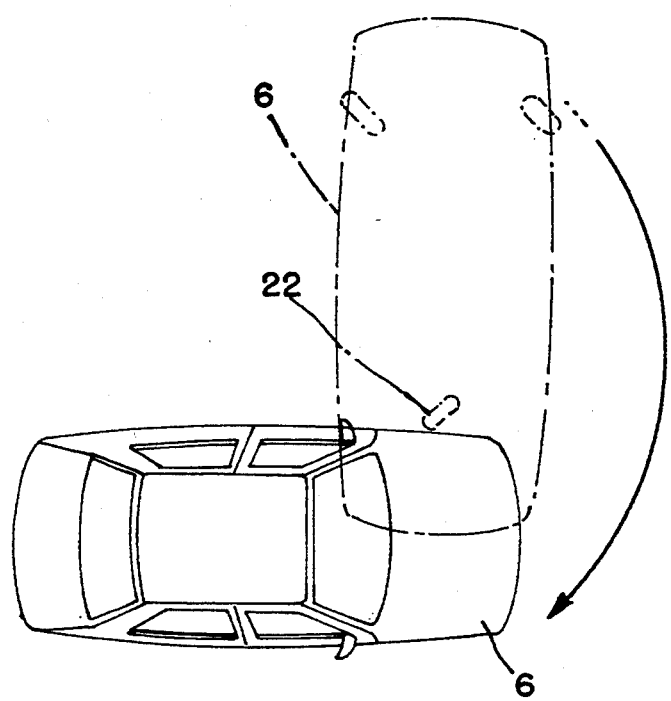
Figure 15:
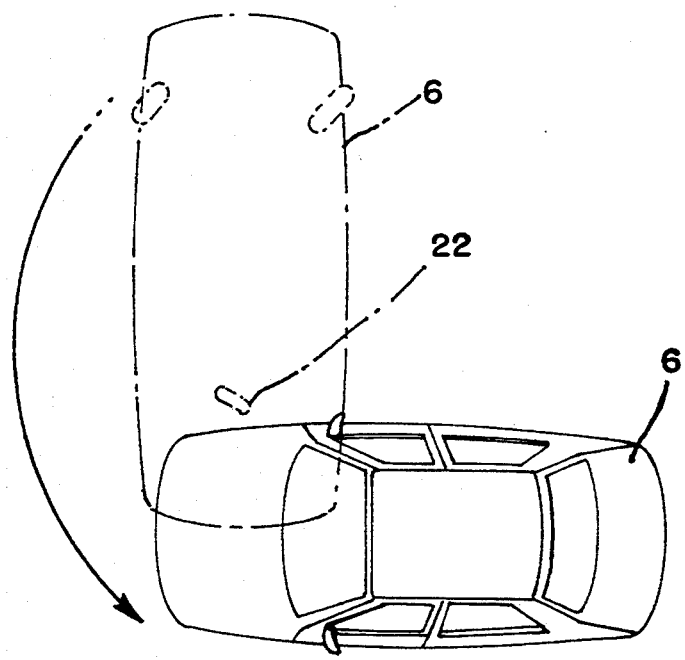
Figure 16:
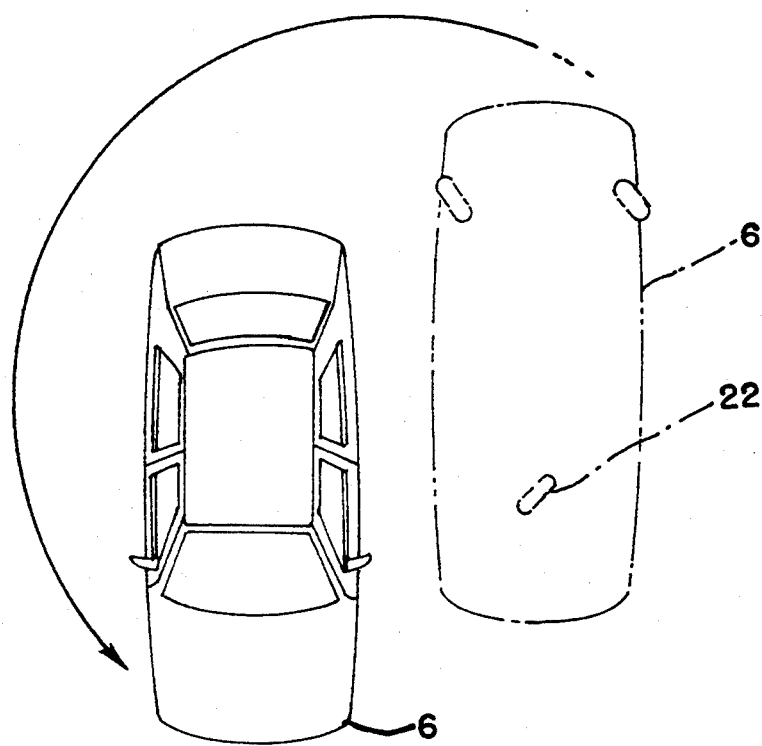
Figure 17:
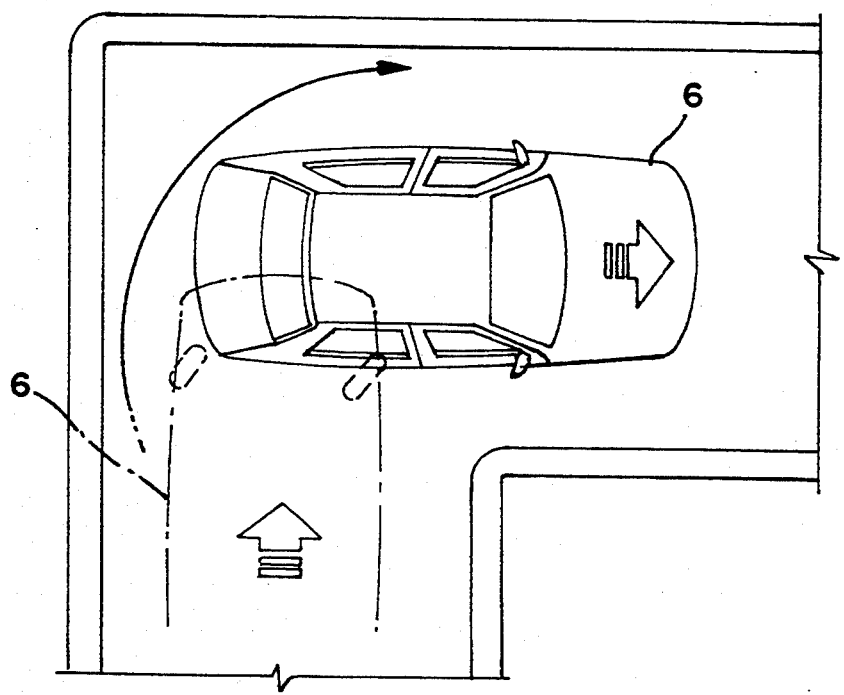

Furthermore, as shown in FIGS. 14 and 15, a driver can drive the automobile 6 in the desired direction by driving front or rear wheels after rotating the direction changing wheel 22 and adjusting the rotating angle of the front wheels. As shown in FIGS. 16 and 17, the driver can rotate the automobile through 90°–180 °.

In summary, the direction change device of the present invention is mounted to the conventional suspension of the rear wheel frame. The rear wheels are slightly lifted from the ground by the upright direction change wheel of this invention. The parking or removal of an automobile to and from a small area is achieved by rotating of the wheel of this invention to the desired direction and rotating of the front wheels of the automobile. Furthermore, by such combined rotation of the wheel and the front wheels, a driver can move the automobile diagonally, forwardly or rearwardly.

What is claimed is:

1. A direction changing device for use with an automobile having a chassis, a rear wheel frame, a suspension mounted to the rear wheel frame, and front and rear wheels provided on the automobile, the direction changing device being operated by a power source of a front wheel driving automobile said direction changing device comprising:

a cylinder including means for securing said direction changing device to the suspension, a downwardly extendable piston housed within the cylinder, a direction changing wheel connected to a lower end of the piston, a wheel lifting motor fixed to one side of said cylinder for raising and lowering the direction changing wheel and a wheel orienting motor movably mounted to another side of said cylinder for orienting the direction changing wheel, a foldable bracket pivotally mounted to a lower end of the downwardly extendable piston, the direction changing wheel being movably attached to a lower end of said foldable bracket, the foldable bracket being locked in place when completely folded or unfolded, whereby, when a direction of the automobile is to be changed, the direction changing wheel is extended upon a downward movement of the piston resulting in the rear wheels of the automobile being lifted slightly from a ground surface, the direction changing wheel is turned to a desired orientation by the wheel orienting motor, and the automobile is moved in the desired direction by a driving force of the front wheels after a rotational angle of the front wheels has been adjusted.

2. The direction changing device for use with an automobile according to claim 1, wherein the device is centered on the suspension of the automobile, as corresponding to a center of gravity along a transverse axis of a rear end of the automobile.

3. The direction changing device for use with an automobile according to claim 1, wherein the wheel orienting motor movably mounted to the cylinder is vertically movable together with the piston.

4. The direction changing device for use with an automobile according to claim 1, wherein a lead screw engages a female screw within the piston for being rotatable without changing its place by means of a thrust bearing, the thrust bearing being disposed between an upper, inside of the cylinder and top surface of the lead screw, and wherein upper and lower supports are assembled together by bolt means and spaced apart by a secondary thrust bearing, the upper and lower supports being movable vertically together with the piston, the lower support being rotatable to a left or right position.

5. The direction changing device for use with an automobile according to claims 1 or 3, further comprising a sprocket mounted on an output shaft of a speed-reduction member of the wheel lifting motor, said sprocket being connected through a chain to a sprocket mounted to an upper end of a lead screw extending upwards from the cylinder, whereby the wheel lifting motor will drive the lead screw causing the piston to move vertically.

6. The direction changing device for use with an automobile according to claim 1, further comprising a fixed plate fixed to an upper support, the upper support positioned on a lower end of the piston and a sprocket mounted on an output shaft of a speed-reduction member of the wheel orienting motor connected through a chain to a sprocket mounted on an upper face of a lower support, whereby the direction changing wheel movably attached to a bracket hinged to a lower portion of the lower support will change its direction to the right or left by the wheel orienting motor.

7. The direction changing device for use with an automobile according to claim 1, further comprising a lower support rotatably attached to a lower end of the piston and hinged to one side of an upper face of said foldable bracket for effecting folding and unfolding of the direction changing device, and locking means for engaging firmly with a locking means receiving hole provided in the bracket opposite to the hinged portion and wherein an extension from one end of the foldable bracket engages firmly with a U-shaped locking member for locking the direction changing wheel in place.

8. The direction changing device for use with an automobile according to claims 1 or 6, wherein a folding and upright movement of the direction changing wheel and the folding bracket is forcedly and easily achieved by a tilting angle made when a roller extended from the upper face of the bracket slides along an upper slanted guiding path section of a guide member upon the movement of the piston, or by a tension force of a pair of springs, the tension force changing by the crossing point of the springs which are off to the right or left of the hinged portion.

9. The direction changing device for use with an automobile according to claim 1, wherein a vertically movable distance of the piston is controlled by a pair of control switches mounted to one side of the cylinder.

10. The direction changing device for use with an automobile according to claims 1 or 6, wherein movement to the left or right or to a neutral position of the direction changing device is controlled by a pair of control switches and a neutral switch provided in a fixed member.

* * * * *

UNITED STATES PATENT AND TRADEMARK OFFICE
CERTIFICATE OF CORRECTION

PATENT NO. : 5,419,580
DATED : May 30, 1995
INVENTOR(S) : Dong C. Ku

It is certified that error appears in the above-indentified patent and that said Letters Patent is hereby corrected as shown below:

On the Title Page, under the Heading, [30] Foreign Application Priority Data, change "Mar. 9 1991 [KR] Rep. of Korea ....... 1991-15351"

to

-- Sep. 3, 1991 [KR] Rep. of Korea ....... 1991-15351 --

Signed and Sealed this

Twenty-eighth Day of November 1995

*Attest:*

BRUCE LEHMAN

*Attesting Officer*    *Commissioner of Patents and Trademarks*